Jan. 6, 1931.    J. C. W. HUMFREY    1,788,301
CLUTCH FOR MECHANICALLY PROPELLED VEHICLES
Filed Nov. 14, 1927    2 Sheets-Sheet 1
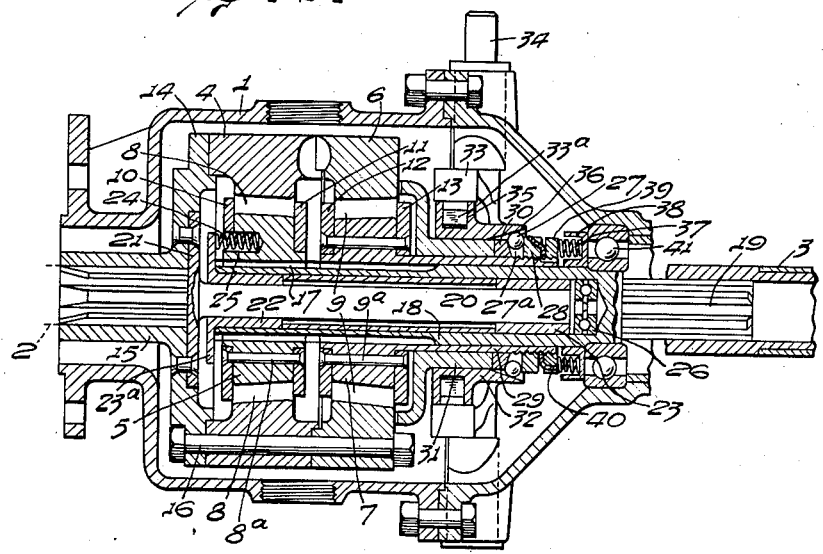
Fig. 1.
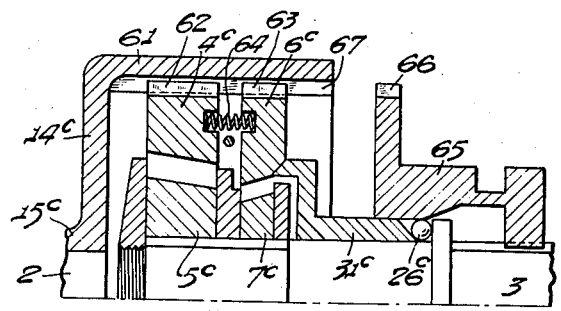
Fig. 2.
Inventor
John C. W. Humfrey
By
Attorney Jan. 6, 1931.  J. C. W. HUMFREY  1,788,301
CLUTCH FOR MECHANICALLY PROPELLED VEHICLES
Filed Nov. 14, 1927  2 Sheets-Sheet 2
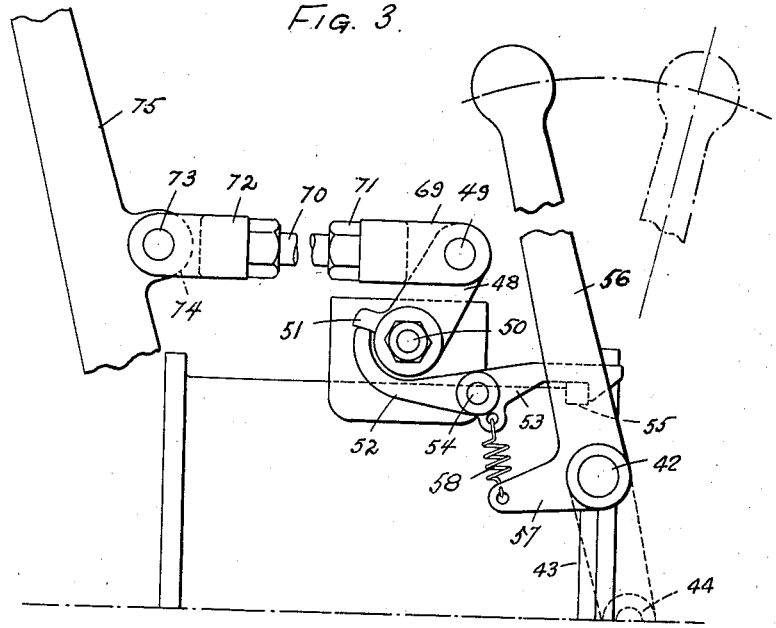
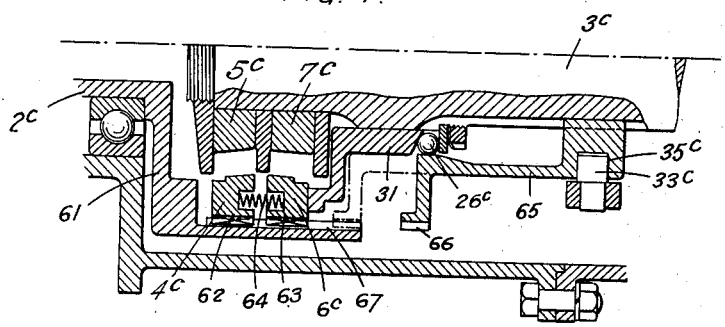
Inventor
John C. W. Humfrey
By James L. Norris
Attorney.

Patented Jan. 6, 1931

1,788,301

UNITED STATES PATENT OFFICE

JOHN CHARLES WILLIS HUMFREY, OF LONDON, ENGLAND, ASSIGNOR, BY DIRECT AND MESNE ASSIGNMENTS, TO THE HUMFREY-SANDBERG COMPANY LIMITED, OF LONDON, ENGLAND, A BRITISH COMPANY

CLUTCH FOR MECHANICALLY-PROPELLED VEHICLES

Application filed November 14, 1927, Serial No. 233,206, and in Great Britain December 11, 1926.

The invention relates to clutches for mechanically propelled vehicles and consists in a combined forward and reverse clutch in which both clutches are of the automatic free-wheel skewed roller type, as described in U. S. Patent No. 1,670,197, dated May 15, 1928, and in which the reverse clutch is operated by the driver.

The clutches are fitted between the gear box and the driving wheels.

The forward clutch is so constructed that it is automatically locked under spring pressure when the vehicle is driven in the forward direction, but automatically disengages when the vehicle over-runs the engine so as to allow of an automatically operating freewheel action.

In one construction the reverse clutch unit consists of a skewed roller type clutch for the purpose of equalizing, or approximately equalizing, the speed of the gear box or the engine and gear box and vehicle, before a further operation by the driver engages a dog clutch and enables full power to be transmitted to the driven shaft.

The clutches may be driven by "floating" dog teeth engaging with corresponding teeth provided on a member secured to the driving shaft.

The arrangement of the clutches according to the invention is such that the car can be reversed or that the reverse clutch enables the engine to be used as a brake at any time.

In the accompanying drawings which represent examples of combined forward and reverse clutches according to the invention—

Fig. 1 is a central section of a combined forward and reverse clutch according to the invention;

Fig. 2 shows a partial central section of a modification in which a free-wheel clutch is used for the forward drive and a combination of the skewed roller clutch and a positive dog clutch for the reverse drive;

Fig. 3 is a half elevation; and

Fig. 4 a half plan showing the connection between the means for engaging the reverse clutch and the pedal lever operating the main clutch.

Referring to the arrangement shown in Fig. 1, 1 is the housing or casing of the clutches, 2 the shaft connected to the change speed gear, 3 the propeller shaft, 4 the outer member and 5 the inner member of the forward clutch, 6, 7, respectively, the outer and inner members of the reverse clutch, 8 and 9 are the skewed rollers of the forward and reverse clutches. These clutches are of the type described in U. S. Patent No. 1,670,197.

Plates secured to the inner clutch member 5 are shown at 10, 11 for retaining the rollers 8, and similar plates 12, 13 are shown for retaining the rollers 9 of the clutch member 7. The plates 10, 11 are connected by pins $8^a$ and the plates 12, 13 are connected by pins $9^a$. The flanged end 14 of a sleeve 15 keyed to the shaft 2 is secured by bolts 16 to the outer clutch members 4 and 6. The inner clutch members 5 and 7 are splined at 17 to a hollow shaft 18 secured by splines 19 to the shaft 3.

A central shaft 20 coaxial with the shafts 2 and 3 carries at its front end a disc 21 riveted to the flange 14. Sleeves 22, 23 secured, respectively, at the front and rear ends of the shaft 20 form bearings for the shaft 18. A flange $23^a$ at the front end of the sleeve 22 acts as an abutment for springs 24, the other ends of which engage in recesses 25 provided in the clutch member 5.

The springs 24 control the engagement of the forward clutch and allow of free-wheeling when the car over-runs the engine. A thrust bearing 26, the races of which are, respectively, connected to the shafts 18 and 20, prevents relative endwise motion of these parts.

Balls 27 are supported in an inwardly tapering groove $27^a$ formed between a ring 28, screw-threaded on a rearward extension 29 of the inner clutch member 7, and a ring 30 abutting against a sleeve 31 running on the extension 29. The claw-shaped flanged front end of the sleeve 31 abuts against the rear end of the outer clutch member 6.

A sleeve 32 is adapted to be moved axially on the sleeve 31 by a forked lever 33 attached to a spindle 34, squared pins $33^a$ on the lever fitting in a corresponding recess 35 of the sleeve 32.

The rear portion 36 of the sleeve 32 is inclined as shown so that when it is moved to the right (Figure 1) the balls 27 are forced inwardly into the groove 27$^a$ and move the inner member 7 axially to the right and consequently out of engagement with the outer member 6 of the reverse clutch.

When the sleeve 32 is moved to the left, the balls 27 can move radially outwards and the inner member 7 is gradually moved into engagement with the outer member 6 of the reverse clutch by springs 37 inserted in cup-shaped recesses of a ring 38 on the shaft 18 and having their rear ends bearing against the bottoms of said recesses. The other ends of the springs 37 bear against a nut 39, screw-threaded on the extension 29 of the inner member 7, and engaging by means of a locking washer 40 with the ring 28.

The movement of the lever 33 can be controlled so that the reverse clutch can slip at any predetermined torque. Ball bearings 41 are provided towards the rear end of the shaft 18.

In the reverse direction of running the forward clutch comprising the members 4 and 5 is automatically disengaged by the axial component of the frictional resistance of the rotating rollers 8 as explained in my above-mentioned U. S. Patent No. 1,670,197.

Referring to Fig. 2, the flange 14$^c$ of the sleeve 15$^c$ is provided with a cylindrical axial extension 61, internal teeth 67 on which engage with teeth 62, 63 on the outer periphery of the members 4$^c$ and 6$^c$. A certain amount of "float" is allowed in the teeth so that the members 4$^c$, 6$^c$ can accurately center themselves on the rollers.

Springs 64 between the adjacent sides of the outer members 4$^c$, 6$^c$ tend to move the clutches into engagement.

The sleeve 65 is adapted to be moved axially, like the sleeve 32 of Fig. 1, and is shown as having the balls 26$^c$ radially inwards, and as also having forced the sleeve 31$^c$ and outer member 6$^c$ to the left against the resistance of the spring 64, in which position the reverse clutch 6$^c$, 7$^c$ is out of engagement.

This arrangement is shown more fully in Figs. 3 and 4.

A hand lever 56 similar to the lever (not shown) engaging with spindle 34 shown in Fig. 1 is pivoted at 42 on the clutch casing and carries at its lower end a forked extension in which pins 33$^c$ engage in a corresponding recess 35$^c$ of the sleeve 65.

If the sleeve 65 which is splined to the shaft 3$^c$ is moved to the left, the balls 26$^c$ can move outwards and allow the sleeve 31$^c$ and the outer clutch member 6$^c$ to move to the right and gradually bring the reverse clutch into engagement; according to the axial position imparted to the sleeve 65 the clutch will slip at a predetermined torque.

When the shaft 2$^c$ and 3$^c$ are revolving at the same or nearly the same speed, the sleeve 65 is moved further to the left until the teeth 66 on its periphery engage with teeth 67 on the interior of the axial extension 61. The power is then transmitted to the shaft 3$^c$ through the clutch sleeve 65.

Figs. 3 and 4 illustrate means by which the reverse clutch control is interlocked with the main clutch pedal, so that the reverse clutch cannot be engaged until the main clutch is released. The arrangement is shown as applied to the combined clutch shown in Fig. 2, but it can equally well be applied to the clutch shown in Fig. 1.

A lever 48 is pivoted at 50 to the casing of the clutch and is connected by a pin 49 to a forked sleeve 69 in which a pull rod 70 is screw-threaded and secured by a nut 71. The other end of the rod 70 is similarly connected to a fork ended sleeve 72 which engages with a pin 73 inserted in a boss 74 of the pedal lever 75 connected to the main clutch of the engine.

In the normal working position of the pedal lever 75, a lug 51 on the lever 48 engages with one end of a double armed lever 52, 53 pivoted at 54 to the casing of the clutch. The end of the arm 53 is hook-shaped and engages over a stop 55 on the lever 56.

A spring 58 secured to a boss of the lever 52, 53 and to a short arm 57 of the hand lever 56 holds the arm 53 against the stop 55 and prevents the hand lever 56 from being moved so as to engage the reverse clutch until the pedal lever 75 has been operated to release the main clutch and move the lever 48 in the anti-clockwise direction, so that the lug 51 has depressed the arm 52 and raised the arm 53 and thereby freed the hand lever 56 which can then be moved into the position shown in dot and dash lines corresponding to the engagement of the reverse clutch.

The arrangement ensures that the reverse clutch engages easily, since only the change speed gear has to be accelerated to the speed of the car, the engine being speeded up gradually by the main clutch.

Having thus described the nature of the said invention and the best means I know of carrying the same into practical effect, I claim:—

1. A combined forward and reverse clutch mechanism for coupling two coaxial shafts, each of said clutches comprising an inner and outer member coaxial with the axis of the said shafts and skew rollers inserted in a channel formed between said members, one of said members of each clutch being slidably but non-rotatably secured to one of said shafts, spring means for urging said sliding members into the locking positions and manually operative means for controlling the reverse clutch.

2. A combined forward and reverse clutch mechanism according to claim 1, in which the manually operative means for controlling the reverse clutch includes a lever which, in one position, prevents the engagement of the clutch and in another position allows the said clutch to move under spring pressure into the locking position.

3. A combined forward and reverse clutch mechanism according to claim 1, in which the means for controlling the reverse clutch includes a lever which, in one position, prevents the engagement of the reverse clutch, and in another position allows the said clutch to move under spring pressure into the locking position, and in intermediate positions allows any required amount of "slip" to be imparted to the reverse clutch.

4. A combined forward and reverse clutch according to claim 1, comprising also a casing attached to said driving shaft, teeth on said casing, a sliding member splined to said driven shaft, and teeth on said sliding member adapted to engage with said teeth on said casing.

5. A combined forward and reverse clutch according to claim 1, comprising also a casing attached to said driving shaft, teeth on said casing, a sliding member, teeth on the periphery of said sliding member, and a lever which in one position prevents the engagement of the reverse clutch, in another position allows the clutch to move under spring pressure into the locking position, and in a third position effects the engagement of the teeth on the sliding member with the teeth on the said casing.

6. A combined forward and reverse clutch according to claim 1, in which the manually operative means for controlling the reverse clutch includes a lever which, in one position prevents the engagement of the clutch and in another position allows the said clutch to move under spring pressure into the locking position, a detent holding said manually operated lever in a position in which the reverse clutch is disengaged, a main clutch pedal, and means operated by said main clutch pedal for releasing said detent.

7. A combined forward and reverse clutch according to claim 1, in which the manually operative means for controlling the reverse clutch includes a lever which, in one position prevents the engagement of the clutch and in another position allows the said clutch to move under spring pressure into the locking position, a projection on said manually operated lever, a pivoted lever, a hooked end on said pivoted lever engaging the said projection and holding said manually operated lever in a position in which the reverse clutch is disengaged, a main clutch pedal, a second pivoted lever connected to said clutch pedal, and means by which said second lever prevents the release of said detent until said main clutch pedal is operated.

In testimony whereof I have signed my name to this specification.

JOHN CHARLES WILLIS HUMFREY.